United States Patent
Wu et al.

(10) Patent No.: US 10,542,284 B2
(45) Date of Patent: *Jan. 21, 2020

(54) METHOD AND ARRANGEMENT FOR VIDEO CODING

(71) Applicant: Telefonaktiebolaget L M Ericsson (publ), Stockholm (SE)

(72) Inventors: Zhuangfei Wu, Solna (SE); Kenneth Andersson, Gävle (SE); Clinton Priddle, Carindale (AU); Thomas Rusert, Kista (SE); Rickard Sjöberg, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/718,150

(22) Filed: May 21, 2015

(65) Prior Publication Data

US 2015/0264393 A1 Sep. 17, 2015

Related U.S. Application Data

(63) Continuation of application No. 13/515,140, filed as application No. PCT/SE2010/051412 on Dec. 17, 2010, now Pat. No. 9,071,845.

(Continued)

(51) Int. Cl.
*H04N 7/12* (2006.01)
*H04N 19/573* (2014.01)
(Continued)

(52) U.S. Cl.
CPC ......... *H04N 19/573* (2014.11); *H04N 19/159* (2014.11); *H04N 19/46* (2014.11);
(Continued)

(58) Field of Classification Search
CPC .. H04N 7/50; H04N 7/26244; H04N 7/26271; H04N 7/26015; H04N 7/26031
(Continued)

(56) References Cited

U.S. PATENT DOCUMENTS 6,535,558 B1\* 3/2003 Suzuki ................ H04N 19/105
375/240.12
8,320,453 B2\* 11/2012 Jeon ....................... H04N 19/70
341/107
(Continued)

FOREIGN PATENT DOCUMENTS

EP 1427216 A1 6/2004
RU 2317654 C2 2/2008
(Continued)

OTHER PUBLICATIONS

ITU-T. "Advanced video coding for generic audiovisual services. Series H: Audiovisual and Multimedia Systems. Infrastructure of audiovisual services—Coding of moving video." Mar. 2009. H.264. ITU-T. Geneva, Switzerland.

(Continued)

*Primary Examiner* — Jeremiah C Hallenbeck-Huber
(74) *Attorney, Agent, or Firm* — Coats & Bennett, PLLC

(57) ABSTRACT

Methods and arrangements for video coding are provided. In one exemplary embodiment, a method performed by a video decoder may include decoding an encoded video block based on a single index corresponding to the encoded video block and a predetermined reference picture list to obtain a decoded video block. Further, the index may represent a combination of a reference mode and one or more reference pictures associated with the predetermined reference picture list.

17 Claims, 11 Drawing Sheets

Related U.S. Application Data

(60) Provisional application No. 61/287,242, filed on Dec. 17, 2009.

(51) Int. Cl.
  | | |
  |---|---|
  | *H04N 19/46* | (2014.01) |
  | *H04N 19/159* | (2014.01) |
  | *H04N 19/513* | (2014.01) |
  | *H04N 19/105* | (2014.01) |
  | *H04N 19/70* | (2014.01) |
  | *H04N 19/154* | (2014.01) |
  | *H04N 19/107* | (2014.01) |
  | *H04N 19/172* | (2014.01) |
  | *H04N 19/176* | (2014.01) |

(52) U.S. Cl.
  CPC ......... *H04N 19/513* (2014.11); *H04N 19/105* (2014.11); *H04N 19/107* (2014.11); *H04N 19/154* (2014.11); *H04N 19/172* (2014.11); *H04N 19/176* (2014.11); *H04N 19/70* (2014.11)

(58) Field of Classification Search
  USPC ..................................................... 375/240.12
  See application file for complete search history.

(56) References Cited

U.S. PATENT DOCUMENTS

| | | | |
|---|---|---|---|
| 8,428,373 B2 | 4/2013 | Jeon et al. | |
| 2001/0056565 A1 | 12/2001 | Li | |
| 2004/0028282 A1 | 2/2004 | Kato et al. | |
| 2004/0047418 A1* | 3/2004 | Tourapis | H04N 19/00684 375/240.16 |
| 2004/0141615 A1* | 7/2004 | Chujoh | H04N 19/105 380/200 |
| 2004/0213468 A1 | 10/2004 | Lee et al. | |
| 2004/0233989 A1* | 11/2004 | Kobayashi | H04N 19/105 375/240.16 |
| 2004/0234144 A1 | 11/2004 | Sugimoto et al. | |
| 2005/0053156 A1 | 3/2005 | Lin et al. | |
| 2005/0063466 A1* | 3/2005 | Etoh | H04N 9/8042 375/240.16 |
| 2005/0100093 A1* | 5/2005 | Holcomb | H04N 19/70 375/240.12 |
| 2005/0117646 A1* | 6/2005 | Joch | H04N 19/51 375/240.16 |
| 2005/0185713 A1 | 8/2005 | Winger et al. | |
| 2006/0093038 A1 | 5/2006 | Boyce | |
| 2006/0133492 A1 | 6/2006 | Boyce | |
| 2006/0153297 A1 | 7/2006 | Boyce | |
| 2008/0159638 A1 | 7/2008 | Song et al. | |
| 2009/0067505 A1 | 3/2009 | Tourapis et al. | |
| 2009/0168886 A1 | 7/2009 | Ikeda et al. | |
| 2009/0187960 A1 | 7/2009 | Lee et al. | |
| 2010/0086052 A1* | 4/2010 | Park | H04N 19/176 375/240.16 |
| 2010/0129052 A1 | 5/2010 | Fujinami et al. | |
| 2010/0150394 A1* | 6/2010 | Bloom | G06T 1/0035 382/100 |

FOREIGN PATENT DOCUMENTS

| | | |
|---|---|---|
| RU | 2335856 C1 | 10/2008 |
| WO | 03026296 A1 | 3/2003 |

OTHER PUBLICATIONS

Huo et al. "A Flexible Reference Picture Selection Method for Spatial Direct Mode in Multiview Video Coding". Congress on Image and Signal Processing, May 27-30, 2008; pp. 268-272; vol. 1.

Puri et al. "Video Coding using the H.264/MPEG-4 AVC compression standard". Signal Processing: Image Communication 19, 2004, pp. 793-849, Elsevier.

Jeon et al. "Advanced temporal direct mode in B pictures". Electronics Letters, Feb. 19, 2004; pp. 234-235, vol. 40 No. 4.

\* cited by examiner

|  | AVC | RIS |
| --- | --- | --- |
| Number of reference picture lists | 2 | 1 |
| Reference index contained in each list | L0: 0, 1<br>L1: 0, 1 | L: 0, 1, 2, 3, 4, 5, 6, 7 |
| Uni-directional prediction | List = L0; Idx = 0 | Idx = 0 |
|  | List = L1; Idx = 0 | Idx = 1 |
|  | List = L0; Idx = 1 | Idx = 3 |
|  | List = L1; Idx = 1 | Idx = 4 |
| Bi-prediction | List = L0; Idx = 0,<br>List = L1; Idx = 0 | Idx = 2 |
| Bi-prediction | List = L0; Idx = 1,<br>List = L1; Idx = 1 | Idx = 5 |
| Bi-prediction | List = L0; Idx = 0,<br>List = L1; Idx = 1 | Idx = 6 |
| Bi-prediction | List = L0; Idx = 1,<br>List = L1; Idx = 0 | Idx = 7 |

Figure 2

| 1 | 2 | 0 |
|---|---|---|
| 1 | curr | |

Count_0 = 1
Count_1 = 2  } highest count = 2
Count_2 = 1

Prediction = 1

Figure 9

| 2 | 2 | 1 | 1 | 1 |
|---|---|---|---|---|
| 2 | current block | | | |
| 2 | | | | |
| 1 | | | | |
| 0 | | | | |

Count_0 = 1
Count_1 = 4 } highest count = 4
Count_2 = 4

Prediction = 1

Figure 10

| Index symbol | codeword |
|---|---|
| 0 | 0 |
| 1 | 10 |
| 2 | 11 |

Figure 11

| Index symbol | codeword |
|---|---|
| Equal to prediction | 0 |
| Unequal to prediction | 10 |
| Unequal to prediction | 11 |

Figure 12

METHOD AND ARRANGEMENT FOR VIDEO CODING

CROSS-REFERENCE TO RELATED APPLICATIONS

This application is a continuation of U.S. patent application Ser. No. 13/515,140, filed Jun. 11, 2012, which is the National Stage of International App. No. PCT/SE2010/051412, filed Dec. 17, 2010, which claims priority to U.S. Provisional App. No. 61/287,242, filed Dec. 17, 2009, all of which are hereby incorporated by reference as if fully set forth herein.

TECHNICAL FIELD

The invention relates generally to a method and an arrangement for encoding of information related to video coding.

BACKGROUND

Video coding may be performed in intra mode and/or inter mode. Intra mode exploits redundancies within a video frame, and inter mode exploits redundancies between video frames. In inter mode, pixel luma/chroma predictions are obtained from already coded/decoded pictures called reference pictures. Depending on the number of reference pictures used for prediction, inter mode is categorized into uni-prediction mode (or uni-directional mode), bi-prediction mode (B mode), and possibly tri-prediction mode, etc., where, respectively, 1, 2 and 3 reference pictures are used. Within this document, these different modes, i.e. uni-prediction, bi-prediction, etc., will be referred to as "reference modes".

Advanced Video Coding (AVC), which is also known as H.264 and MPEG-4 Part 10, is the state of the art standard for 2D video coding from ITU-T (International Telecommunication Union-Telecommunication Standardization Sector) and MPEG (Moving Picture Experts Group). The AVC codec is a hybrid codec, which takes advantage of eliminating redundancy between frames and within one frame.

In AVC, indicators of the relevant reference pictures are placed in order into two reference lists. The indicators are denoted reference indices, and are numbered from 0 to N, e.g. (0,1, ... , N). The first list, List 0 (L0), primarily manages the past reference pictures, i.e. reference pictures preceding a current picture in time, and the second list, List 1 (L1), typically manages the future reference pictures, i.e. reference pictures subsequent to a current picture in time. For low delay video coding, L1 can also manage past reference pictures. Each list can hold indices of up to 15 reference pictures, i.e. N=14).

Further, in AVC, an indicator, or reference mode index, specifying the selection of one of the reference picture lists (e.g. for uni-prediction), or both reference picture lists (e.g. for bi-prediction), is coded together with the partition structure in Macro Block (MB) mode/sub-MB mode, while the indicators, or reference picture indices, specifying the selected reference pictures in the respective lists are coded as separate syntax elements. "Partition structure" refers to partitions, such as e.g. 16×16, 16×8 or 8×16, of a 16×16 MB. A partition, e.g. 16×16, is typically associated with one motion vector (MV) and one reference index when uni-prediction is used, and with two MVs and two reference indices when bi-prediction is used. An MV has an horizontal component MVx and a vertical component MVy that describes how pixels of the current partition are produced from the corresponding reference picture, such as Ipred(x,y)=Iref(x-MVx,y-MVy).

The number of reference pictures associated with a picture or partition depends on the reference mode associated with the same partition, i.e. whether it is uni-prediction or bi-prediction, etc. When decoding the reference information in a decoder, both the reference mode index and the one or more reference picture indices associated with a picture or partition must be correctly decoded, in order for the decoder to be able to decode the picture or partition correctly. Incorrect decoding of either of the reference mode index and the one or more reference picture indices may result in erroneous interpretation of the reference information.

The current methods of coding reference information, such as the method of AVC described above, require a relatively large number of bits in order to convey the reference information associated with each block. This is identified as inefficient in terms of coding efficiency.

SUMMARY

It would be desirable to enable an improved coding efficiency for reference information, i.e. the information identifying the one or more reference pictures used for prediction of a current frame. It is an object of the invention to enable an improved coding efficiency for reference information. Further, it is an object of the invention to provide a method and an arrangement for enabling an improved encoding of reference information. These objects may be met by a method and arrangement according to the attached independent claims. Optional embodiments are defined by the dependent claims. The prediction, encoding and decoding described below may be performed within the same entity or node, or in different entities or nodes.

According to a first aspect, a method is provided in a video decoding entity. The method comprises the obtaining of a single syntax element associated with an encoded block $B_e$. The method further comprises identifying a reference mode and one or more reference pictures based on the obtained syntax element, and the decoding of the block $B_e$, based on the identified reference mode and one or more reference pictures, thus providing a decoded block, B, of pixels.

According to a second aspect, an arrangement is provided in a video decoding entity. The arrangement comprises a functional unit, which is adapted to obtain a single syntax element associated with an encoded block $B_e$. The arrangement further comprises a functional unit, which is adapted to identify a reference mode and one or more reference pictures based on the obtained syntax element. The arrangement further comprises a functional unit, which is adapted to decode the block $B_e$ based on the identified reference mode and one or more reference pictures, thus providing a decoded block B of pixels.

According to a third aspect, a method is provided in a video encoding entity. The method comprises the encoding of a block B of pixels using a reference mode and one or more reference pictures, thus providing an encoded block $B_e$. The method further comprises deriving a single syntax element identifying the reference mode and the one or more reference picture(s) and providing the single syntax element to a decoder of the block $B_e$.

According to a fourth aspect, an arrangement is provided in a video encoding entity. The arrangement comprises a functional unit, which is adapted to encode a block B of pixels using a reference mode and one or more reference pictures, thus providing an encoded block $B_e$. The arrangement further comprises a functional unit, which is adapted to derive a single syntax element identifying the reference mode and the one or more reference pictures. The arrangement further comprises a functional unit, which is adapted to provide the single syntax element to a decoder of the block $B_e$.

The above methods and arrangement may be used for improving coding efficiency. The coding efficiency may be improved, due to that the use of less bits in order to identify the one or more reference pictures used for prediction of a current frame is enabled. The above methods and arrangements may further enable an improved error resilience performance. Further, by the bundling of reference information to form a single syntax element, easy manipulation of reference index numbers becomes feasible. Further, the use of a syntax element as described above will enable the utilization of that some combinations of reference index and reference mode are more probable than others, by enabling efficient coding of these combinations. For example, shorter code words could be assigned to more probable combinations of reference index and reference mode.

The above methods and arrangement may be implemented in different embodiments. In some embodiments the identification of a reference mode and one or more reference pictures is based on a predefined mapping between the syntax element and the reference mode and one or more specific reference pictures. In some embodiment, the single syntax element represents an entry in a first predefined reference lists, which may comprise one or more entries. An entry may identify a plurality of reference pictures or a single reference picture, and may also further identify a reference mode.

The single syntax element may further represent a reference mode and an entry in a second predefined reference list, which may comprise one or more entries identifying a single reference picture, respectively.

The entries in the lists may be identified by list indices. Further, the number of bits representing the obtained syntax element may be related to the probability of the specific values of the syntax element.

In some embodiments, reference information prediction may be performed for Be (or B when in encoding entity), based on single syntax elements associated with neighboring blocks of Be (or B). Further, in some embodiments sub-regions of a block associated with multi-prediction may be identified, for which sub-regions the respective corresponding regions of the multi-prediction reference blocks have a relatively low correlation between them, and then an alternative prediction, instead of the multi-prediction, may be used for the identified sub-regions.

The embodiments above have mainly been described in terms of a method. However, the description above is also intended to embrace embodiments of the arrangements, adapted to enable the performance of the above described features. The different features of the exemplary embodiments above may be combined in different ways according to need, requirements or preference.

According to yet another aspect, a computer program is provided, which comprises computer readable code means, which when executed in one or more processing units, causes any of the arrangements described above to perform the corresponding procedure according to one of the methods described above.

According to yet another aspect, a computer program product is provided, which comprises the computer program of above.

BRIEF DESCRIPTION OF THE DRAWINGS

The invention will now be described in more detail by means of example embodiments and with reference to the accompanying drawings, in which:

FIG. 2 is a table showing differences between AVC reference index representation and a reference index representation according to an example embodiment.

FIGS. 9 and 10 are schematic views illustrating the determining of the frequency of occurrence of different combinations of a reference mode and one or more reference pictures associated with neighboring blocks of a current block, according to exemplifying embodiments.

FIG. 11 is a schematic view illustrating assignment of indicators (code words) to different index symbols, according to the prior art.

FIG. 12 is a schematic view illustrating assignment of indicators (code words), according to an exemplifying embodiment.

DETAILED DESCRIPTION

Briefly described, a new procedure for representing and conveying reference information, i.e. reference mode(s) and reference picture(s), is provided for inter predictive coding and decoding. The procedure may be referred to as Reference Index Signaling, or Reference information Indicator Signaling (RIS).

Within this document, the term "neighboring blocks of block X" is used as referring to blocks which are neighbors of block X, i.e. located adjacent to or in the vicinity of block X. Further, within this document, the term "block" is used as referring to a unit of pixels. The term "reference picture" or "reference block" is used as referring to a previously coded/ decoded picture, a block, a region or an area of a picture, which picture, block, region etc, is used as reference for prediction.

When using RIS, instead of e.g. encoding an indicator of the reference mode in close association with an indicator of the partition structure, and encoding indicators of reference pictures separately, e.g. as in AVC, the indicator of reference mode and the indicator(s) of reference picture(s) associated with an encoded block are "bundled together in one place", i.e. are jointly encoded. The joint encoding of the indicators of reference mode and reference picture(s), i.e. reference information, results in that one single syntax element, or indicator, represents all information on reference mode(s) and reference picture(s) needed, in order to decode the encoded block in a satisfactory manner. That is, once this single syntax element is given for an encoded block, a decoder should be able to identify the reference picture(s) required for decoding the block. The "syntax element" may also be denoted e.g. "syntax unit", "joint indication unit" or "joint identification unit".

Figure 1:
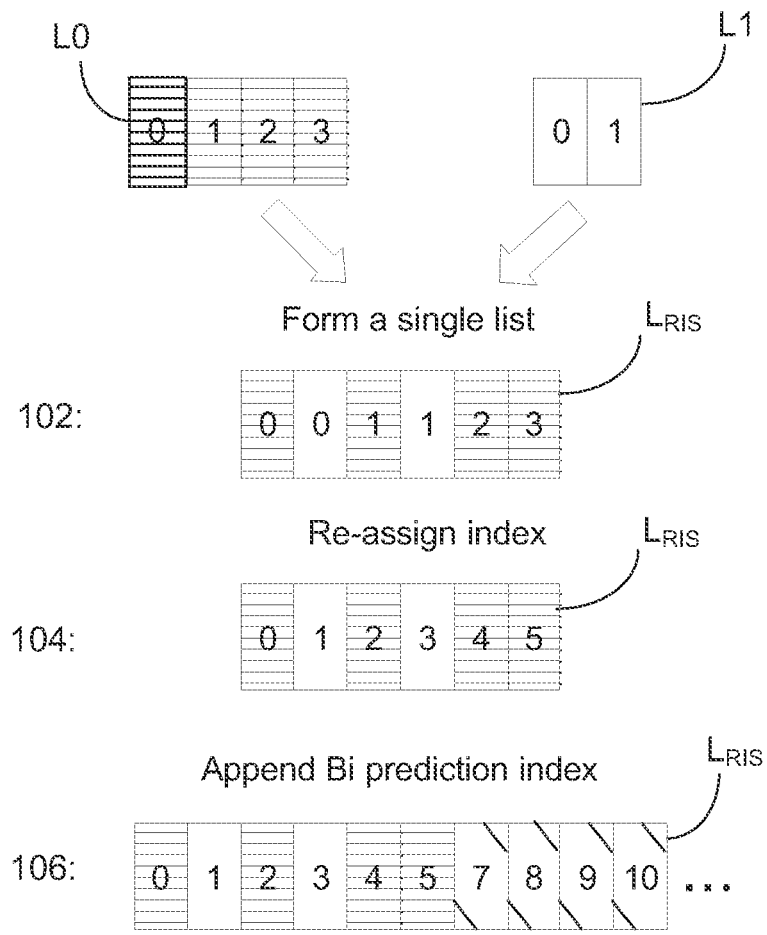
FIG. 1 is a schematic view illustrating a conversion from a reference information representation according to the prior art to a reference information representation according to an example embodiment.

One way to describe RIS is to describe a "conversion" or mapping from a traditional representation, such as e.g. the AVC representation of reference information using two separate lists, to an illustrative representation of reference information according to RIS. Such a conversion to RIS representation could basically be made in three steps, as illustrated in FIG. 1.

The first step 102 could be to form one single reference index list from multiple index lists. For example, instead of managing two reference index lists, as in AVC, all reference picture indices may be sorted in a certain order into a single joint list, as an alternative or a complement to the two lists of AVC. This is illustrated in FIG. 1, where the picture reference index lists L0 and L1 are merged, or multiplexed, into a new list $L_{RIS}$, in an interleaved way. Further, in a second step, 104, the index numbers may be re-assigned accordingly, to follow a consecutive order, i.e. 0-5 in the new list $L_{RIS}$.

The index numbers, or entries, in the list $L_{RIS}$ after step 104, represent information regarding both a reference mode (backward or forward uni-prediction) and a reference picture. An index to an entry in $L_{RIS}$ may be denoted, e.g. a "RIS index" or "index parameter". The RIS index numbers 0-5 in $L_{RIS}$, after step 104 in this example, represent uni-prediction from four past pictures (originally in L0=(0,1,2,3)), and two future pictures (originally in L1=(0,1)).

Further, one or more list entries representing bi-prediction may be added to $L_{RIS}$, e.g. by insertion or appending. Thus, RIS indices indicative of the entries representing bi-prediction do not point to a single reference picture but rather to two reference pictures. Thus, a RIS index can identify a combination of a reference mode and one or more reference pictures.

Consequently, in a final step 106, entries related to bi-prediction mode, where two reference pictures are used for prediction, may be appended consecutively to $L_{RIS}$, and be indicated or represented by RIS indices. For example, the entry with RIS index number 7 can be set to signal or imply that the current picture is using picture number 0 and picture number 1 as bi-prediction references. Thus, this information is inherent in the RIS index 7. Index number 8 can in a similar way be set to imply that the current picture is using picture number 0 and picture number 2 as bi-prediction references. Analogously, the list $L_{RIS}$ may further be extended with entries representing tri-prediction, identifying three reference pictures, and so forth.

Alternatively, the steps 104 and 106 may be performed in the reverse order, such that the entries related to bi-prediction mode are first added, e.g. inserted or appended, and then the index numbers are re-assigned accordingly. As previously described the entries related to bi-prediction mode could also be inserted, e.g. between the entries related to uni-prediction, which would require that re-assignment of index numbers was performed after the insertion, as a complement or alternative to step 104. In this example, the mapping is represented by a single reference list, of which the indices of the different entries represent a reference mode and one or more reference pictures. It should be noted that this is just an optional example, and that the mapping may involve several steps, and that no explicit list or record of the exemplified type is requisite for performing the mapping.

An example of the difference between an AVC reference index representation and a RIS index representation, according to an example embodiment, is shown in a table in FIG. 2. In this example, it is assumed that there are four reference pictures available for coding of a current picture, of which two reference pictures are past reference pictures and two are future reference pictures. In this example RIS representation, the indices 0, 1, 3 and 4 are set to indicate uni-prediction from a respective one of the four reference pictures. The indices 2 and 5 are set to indicate bi-prediction from a respective pair of the four reference pictures. It should be noted that the AVC-signaling of the reference indices also would comprise information related to partitions, since this information is coded together with the reference mode index, such as e.g. "INTER 16×16_L0". This is, however, not shown in FIG. 2.

Figure 3:
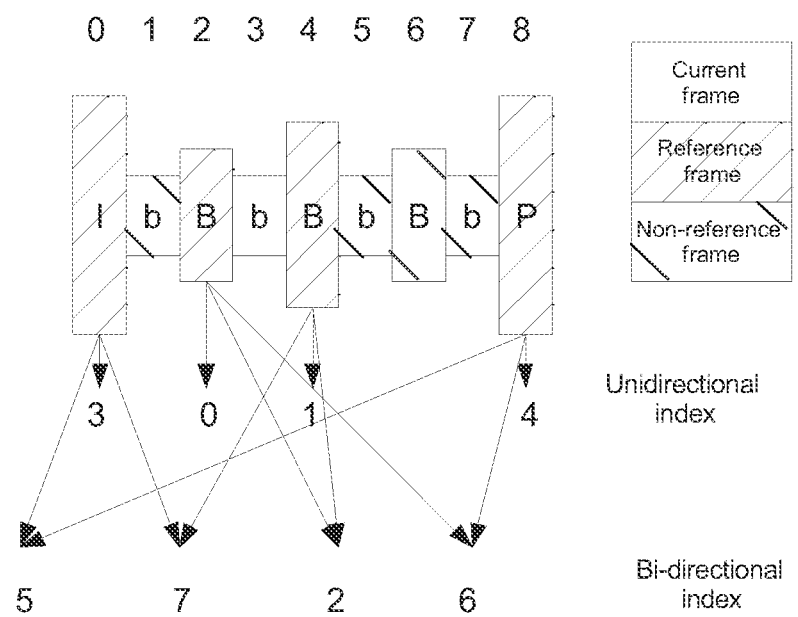
FIG. 3 is a schematic view illustrating assignment of reference information indicators according to an example embodiment.

In the example shown in the table in FIG. 2, some of the RIS indices indicating or representing bi-prediction are placed immediately after the "closest" uni-prediction RIS indices, i.e. interleaved with the indices representing uni-prediction. This RIS index representation is further illustrated in FIG. 3, which shows a so-called 7B hierarchical Group Of Pictures (BGOP). In the figure, the so-called "current frame" i.e. the frame to be encoded, is frame 3 in the 7B GOP. The RIS indices shown in FIG. 3 correspond to the RIS indices 0-7 in the table in FIG. 2. An alternative RIS representation could be to let the RIS indices 0-3 indicate uni-prediction, and the following RIS indices indicate bi-prediction, as in the example illustrated in FIG. 1.

The ways to define the meaning of a RIS index, or RIS parameter, are not limited by the examples given in this document. For example, a mathematic formula could be defined to interpret the meaning of the RIS index, e.g. a function with 2 variables f(RIS_index, current_frame_num) which returns identification of 2 reference picture indices for a bi-prediction RIS index and identifies one reference picture index for a unidirectional RIS index, and so forth. In one example, current_frame_num corresponds to the frame number inside a BGOP of 7B pictures, where 0 is the first frame in display order and 8 is the last frame in the BGOP. In another example, RIS index is always assigned using the formula:

Forward: refidx0
Range: [0~L0_len−1]
Backward: L0_len+refidx1
Range: [L0_len~L0_len+L1_len−1]
Bi: (L0_len+L1_len)+refidx0*L1_len-refidx1
Range: [L0_len+L1_len~L0_len+L1_$_{len+L}$0_len*L1_len−1]

Where refidx0 and refidx1 are the index into reference list L0 and L1 respectively. L0_len and L1_len are the length of list L0 and L1 respectively.

Alternatively, a table may be used to match the RIS index with two corresponding unidirectional indices in case of bi-prediction and one unidirectional index for the case of a single prediction. Which method to select depends e.g. on hardware/software constraints.

However, irrespective of which method that is used for the deriving of a syntax element, the method should be known to both encoder and decoder, such that the encoder is enabled to derive and provide a correct syntax element, and the decoder is enabled to interpret the syntax element correctly and thus identify the reference information needed to decode the encoded block or frame in question.

The RIS index can apply to different levels of video coding, e.g., frame level, large MB level, MB level or sub MB level.

Figure 4:
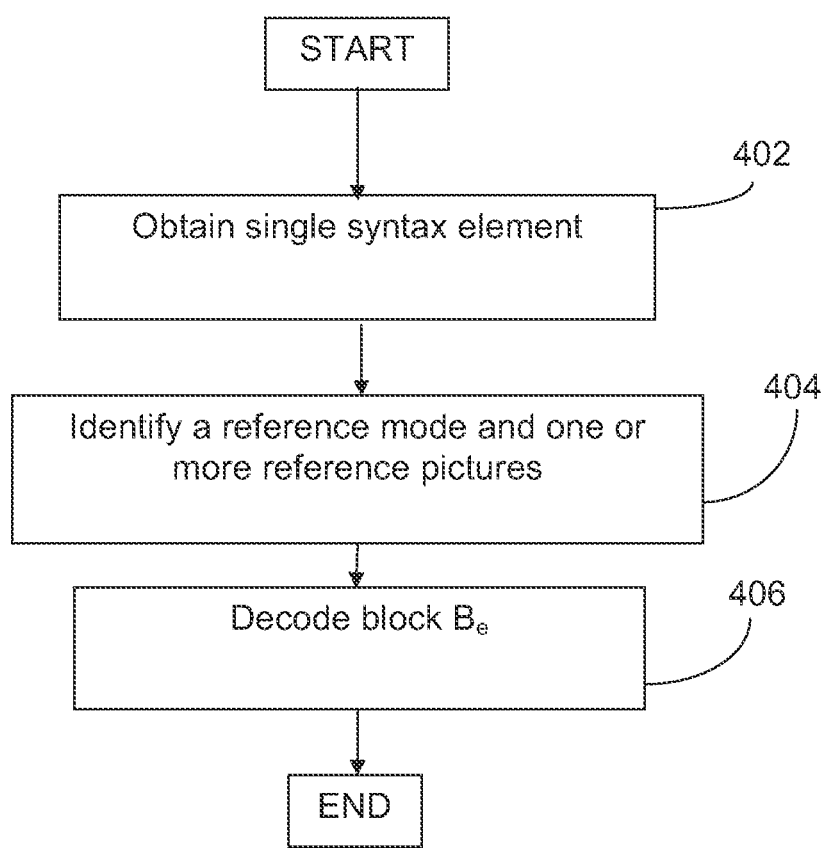
FIG. 4 is a flow chart illustrating a procedure for decoding of jointly encoded information related to a reference mode and one or more reference pictures in a video decoding entity, according to an example embodiment.

Example Procedure, FIG. 4, Decoding

An embodiment of the decoding part of the procedure of conveying reference information will now be described with reference to FIG. 4. The procedure could be performed in a video decoding entity, which could be a video decoder or an entity comprising further functional unit in addition to a video decoder. Initially, a single syntax element associated with an encoded block $B_e$ is obtained in an action 402. The single syntax element may be a unit, e.g. a symbol, in "the bit stream", i.e. the encoded representation of e.g. a video sequence, or be a unit, which is decoded from the bit stream. The syntax element is one or more bits representing a number that corresponds to the reference information, such as e.g. a RIS index. Typically, fewer bits are used to represent RIS indices that are relatively common as compared to the number of bits used to represent RIS indices that are less common. The syntax element is decoded from the bit stream to obtain the number, e.g. RIS index, it represents. Decoding can be made according to VLC (Variable Length Coding) or arithmetic coding, such as CABAC (Context Adapted Binary Arithmetic Coding), for example.

Then, in an action 404, a reference mode and one or more reference pictures to be used when decoding the block $B_e$ are identified based on the obtained syntax element. The identified reference mode and one or more reference pictures correspond to the mode and reference pictures used when encoding the block in an encoder. The identification may involve e.g. the demapping, deciphering or "decoding" of the syntax element using a mapping table, a reference list or other predefined information or function, by use of which a reference mode and one or more reference pictures may be identified, given a syntax element. Further, when having identified the reference mode and one or more reference pictures needed, the encoded block $B_e$, which is assumed to be obtained using conventional methods, is decoded in an action 406.

The single syntax element may be an indicator or index, e.g. denoted RIS index, of an entry in a reference list, which reference list may comprise a plurality of entries, each entry representing or identifying one or more reference modes and one or more reference pictures. Alternatively, the syntax element is a codeword corresponding to an entry in a lookup table. The lookup table may link the codeword e.g. to a reference mode and one or more entries in one or more reference lists, such as e.g. L0 and L1 in AVC. The reference mode may define which single reference list or multiple reference lists that should be used in decoding of the block.

Figure 5:
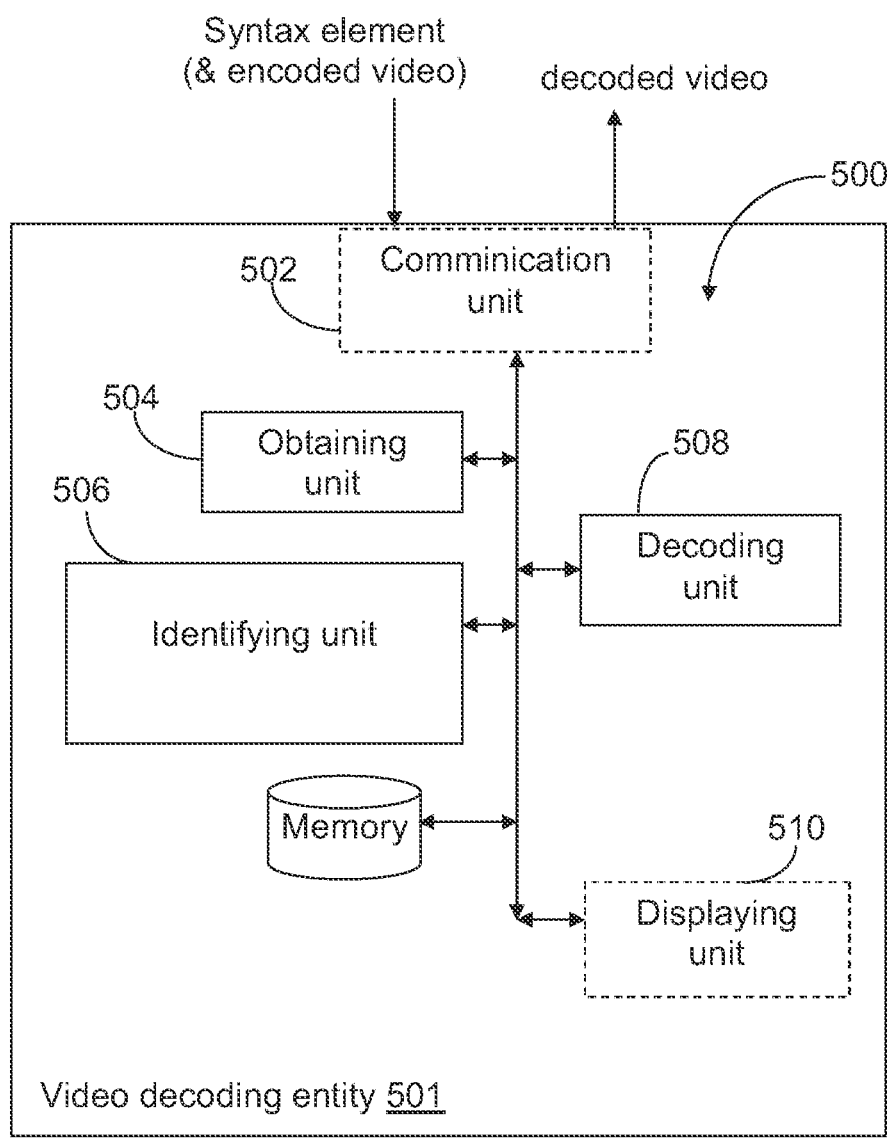
FIG. 5 is a block diagram illustrating an arrangement adapted for decoding of jointly encoded information related to a reference mode and one or more reference pictures in a video decoding entity, according to an example embodiment.

Example Arrangement, FIG. 5, Decoding

Below, an example arrangement 500, adapted to enable the performance of the above described procedure of decoding, will be described with reference to FIG. 5. The arrangement is illustrated as being located in a video decoding entity, 501, which could be a video decoder or an entity comprising further functional units in addition to a video decoder, such as e.g. a computer, a mobile terminal or a video-dedicated device. The arrangement 500 is further illustrated to communicate with other entities via a communication unit 502, which may be considered to comprise conventional means for any type of wired or wireless communication. Encoded video to be decoded is assumed to be obtained from the communication unit 502 or a memory by an obtaining unit 504, and encoded blocks are assumed to be decoded in a decoding unit 508, where the functional unit 508 uses conventional decoding methods.

The obtaining unit 504 is adapted to obtain a single syntax element associated with an encoded block $B_e$. The arrangement 500 further comprises an identifying unit 506, which is adapted to identify a reference mode and one or more reference picture(s) to be used when decoding the block $B_e$, based on the obtained syntax element. As previously described, the arrangement 500 further comprises a decoding unit 508, which is adapted to decode the block $B_e$ based on the determined reference mode and reference picture(s), thus providing a decoded block B of pixels.

In this arrangement the syntax element may be an indicator or index of an entry in a reference list, which reference list may comprise a plurality of entries, each entry representing or identifying one or more reference modes and one or more reference pictures. Alternatively, the arrangement may be adapted to another case when the syntax element is a codeword corresponding to an entry in a lookup table. The lookup table may link the codeword e.g. to a reference mode and one or more entries in one or more reference lists, such as e.g. L1 and L1 in AVC.

The video decoding entity 501 may further comprise e.g. a displaying unit 510, adapted to display the decoded video.

Figure 6:
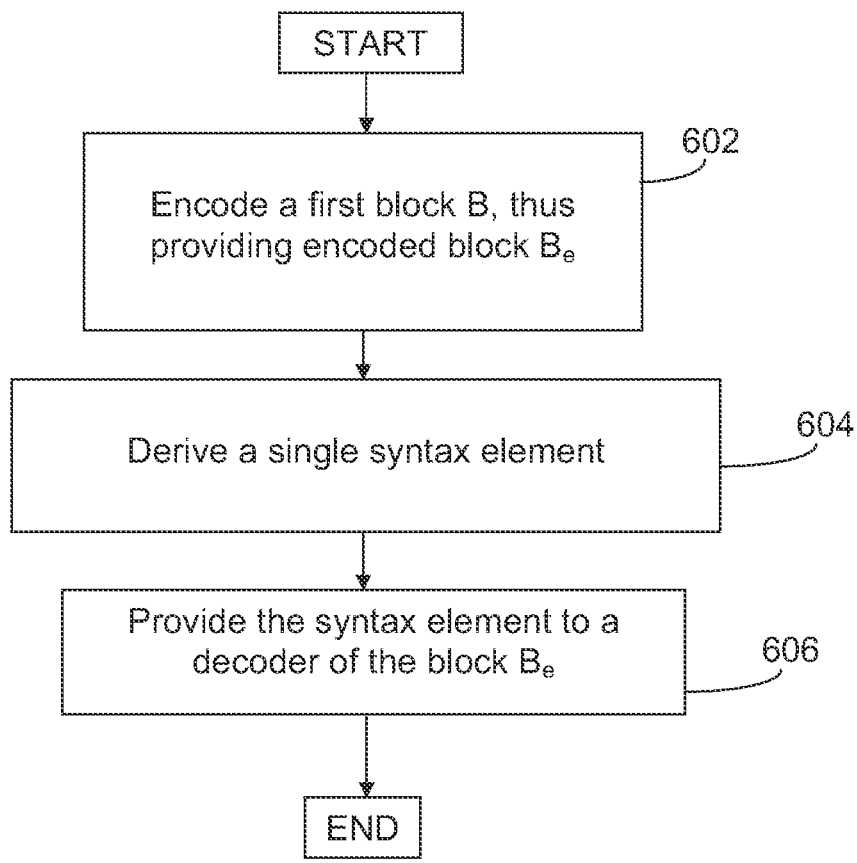
FIG. 6 is a flow chart illustrating a procedure for joint encoding of information related to a reference mode and one or more reference pictures in a video encoding entity, according to an example embodiment.

Example Procedure, FIG. 6, Encoding

An embodiment of the encoding part of the procedure of conveying reference information will now be described with reference to FIG. 6. The procedure could be performed in a video encoding entity, which could be a video encoder, or an entity comprising further functional unit in addition to a video encoder. Initially, a block B of pixels is encoded in an action 602, using a reference mode and one or more reference pictures, thus providing an encoded block $B_e$.

Then, a single syntax element is derived, in an action 604, based on the reference mode and the one or more reference pictures used for encoding, which syntax element thereby identifies, directly or indirectly, the reference mode and the one or more reference pictures used for encoding the block B. The syntax element could e.g. be derived by locating a list entry, corresponding to the reference mode and reference picture(s) used, in a predefined reference list, and then setting the index number of said entry to constitute the syntax element. Alternatively, a predefined mapping table or lookup table could provide a mapping between different combinations of reference modes and reference pictures and different syntax elements. The syntax element could further be an argument to a predefined function, which function returns a reference mode indicator and one or more reference picture indicators. Such an "argument" syntax element could be derived e.g. by means of a predefined "reverse function", taking a reference mode indicator and one or more reference picture indicators as arguments and returning a single syntax element.

Further, the derived syntax element is provided to a decoder of the block $B_e$, in association with the block $B_e$, in an action 606. Thus, the reference information, i.e. the information on the reference mode and on the one or more reference pictures used when encoding the block B, also to be used when decoding the encoded block $B_e$, can be conveyed to a decoder in a compact and error resilient way. The syntax element could e.g. be provided by being transmitted over a radio channel to an entity or node comprising a decoder. Further, the syntax element could e.g. be stored in a memory together with the associated encoded video and be accessed by a decoding entity at another point in time.

Figure 7:
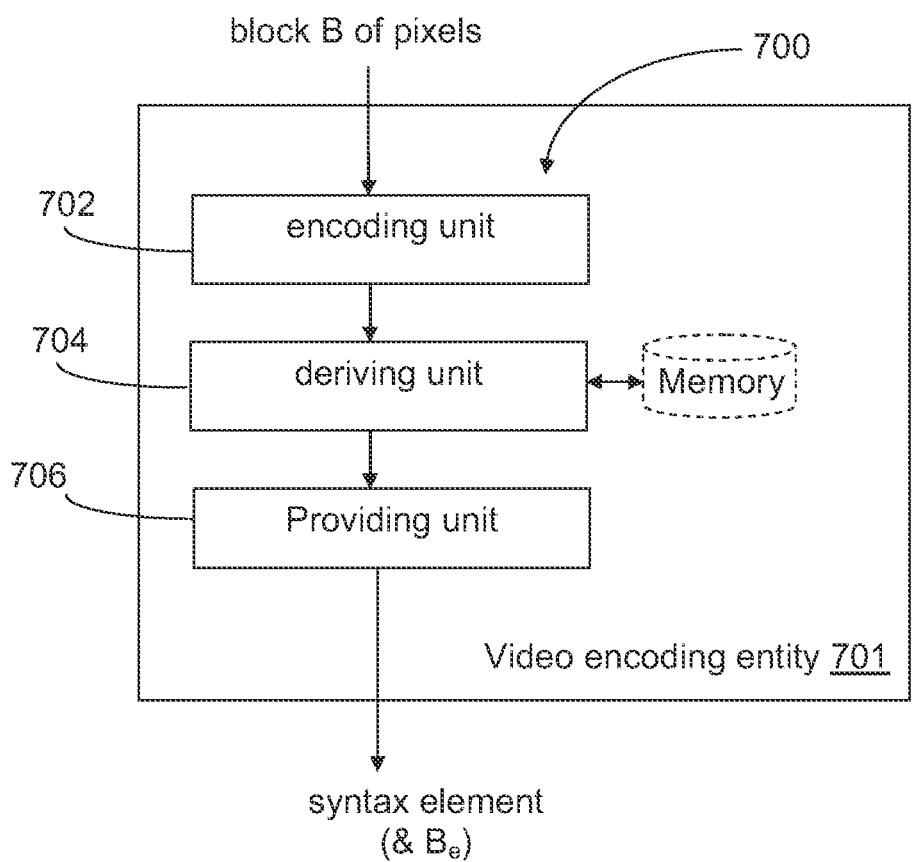
FIG. 7 is a block diagram illustrating an arrangement adapted for joint encoding of information related to a reference mode and one or more reference pictures in a video encoding entity, according to an example embodiment.

Example Arrangement, FIG. 7, Encoding

Below, an example arrangement 700, adapted to enable the performance of the above described procedure related to encoding, will be described with reference to FIG. 7. The arrangement is illustrated as being located in a video encoding entity, 701, which could be a video encoder or an entity comprising further functional unit in addition to a video encoder, such as e.g. a computer, a mobile terminal or a video-dedicated device. The arrangement 700 may communicate with other entities via a communication unit (not shown), which may be considered to comprise conventional means for any type of wired or wireless communication. Uncoded video to be encoded is assumed to be obtained e.g. from the communication unit or a memory.

The arrangement 700 comprises an encoding unit 702, which is adapted to encode a block, B, of pixels using a reference mode and one or more reference pictures, thus providing an encoded block $B_e$. The arrangement 700 further comprises a deriving unit 704, which is adapted to derive a single syntax element, which identifies, directly or indirectly, the reference mode and the one or more reference pictures used when encoding the block B. The index element could be derived in different ways, as previously described, and could be e.g. an indicator, such as e.g. an index, or a codeword, etc.

The arrangement 700 further comprises a providing unit 706, which is adapted to provide the single syntax element to a decoder of the block $B_e$, possibly via a communication unit. The single syntax element may be provided e.g. by transmission over a radio channel to an entity or node comprising a decoder.

Figure 8:
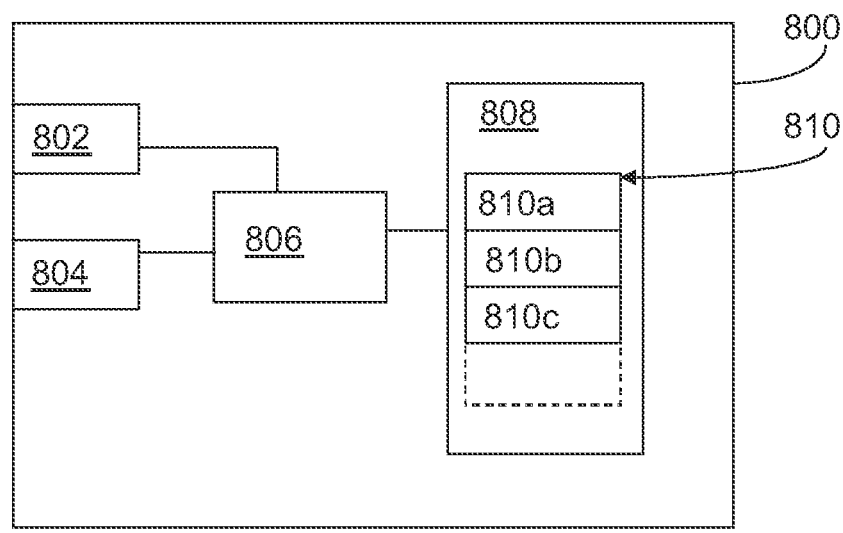
FIG. 8 is a schematic view illustrating an arrangement in a video encoding/decoding entity, according to an example embodiment.

Example Arrangement, FIG. 8

FIG. 8 schematically shows an embodiment of an arrangement 800 in a video decoding entity, which also can be an alternative way of disclosing an embodiment of the arrangement for decoding in a video decoding entity illustrated in FIG. 5. Comprised in the arrangement 800 are here a processing unit 806, e.g. with a DSP (Digital Signal Processor). The processing unit 806 can be a single unit or a plurality of unit to perform different actions of procedures described herein. The arrangement 800 may also comprise an input unit 802 for receiving signals from other entities, and an output unit 804 for providing signal(s) to other entities. The input unit 802 and the output unit 804 may be arranged as an integrated entity.

Furthermore, the arrangement 800 comprises at least one computer program pm duct 808 in the form of a non-volatile memory, e.g. an EEPROM (Electrically Erasable Programmable Read-Only Memory), a flash memory and a hard drive. The computer program product 808 comprises a computer program 810, which comprises code means, which when executed in the processing unit 806 in the arrangement 800 causes the arrangement and/or the video decoding entity to perform the actions of the procedures described earlier in conjunction with FIG. 4.

The computer program 810 may be configured as a computer program code structured in computer program modules. Hence in the example embodiments described, the code means in the computer program 810 of the arrangement 800 comprises an obtaining module 810*a* for obtaining a single syntax element associated with an encoded video unit/block, e.g., by decoding it from a bit stream originating from a data transmitting entity or from a storage, e.g. a memory. The computer program further comprises an identifying module 810*b* for identifying a reference mode and one or more reference pictures based on the obtained syntax element. The computer program 810 further comprises a decoding module 810*c* for decoding of the encoded block.

The modules 810*a-c* could essentially perform the actions of the flow illustrated in FIG. 4, to emulate the arrangement in a video decoding entity illustrated in FIG. 5. In other words, when the different modules 810*a-c* are executed in the processing unit 806, they correspond to the units 502-506 of FIG. 5.

Similarly, a corresponding alternative to the arrangement illustrated in FIG. 7 is possible.

Although the code means in the embodiment disclosed above in conjunction with FIG. 8 are implemented as computer program modules which when executed in the processing unit causes the arrangement and/or video handling/presenting entity to perform the actions described above in the conjunction with figures mentioned above, at least one of the code means may in alternative embodiments be implemented at least partly as hardware circuits.

The processor may be a single CPU (Central processing unit), but could also comprise two or more processing unit. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product comprises a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the data receiving unit.

Further, it is realized that one problem with existing video coding technology is that no satisfying reference mode/reference picture prediction scheme is defined or applied. Below, such a prediction scheme will be described. It is realized that in, for example, a scene-cut/fading/flash scenario, it is quite common that the same e.g. combination of reference mode and reference pictures is used for the prediction of neighboring or adjacent MBs. Further, it is realized that the current coding methods do not take advantage of the correlation between the reference modes/reference picture(s) used for neighboring MBs. In previous solutions, the separate components identifying the MB reference information are encoded independently and conveyed to a video decoder.

An exemplifying prediction scheme on MB level could be described as follows. The exemplifying prediction scheme applies to both encoder and decoder, and it could be applied for any block size.

In association with the encoding/decoding of a current MB, the encoder/decoder is arranged to analyze the reference indicators of the encoded MBs in the surrounding, also called "the context" of the MB. These surrounding blocks could also be denoted the "neighboring blocks" of the current block. The encoder/decoder counts the number of times each one out of a set of candidate indicators or indices appears amongst the neighboring blocks, and selects one, e.g. according to a predefined scheme, with the highest count, as being a prediction or estimate. The selected reference indicator should be related to inter prediction. The selected reference indicator is set to be a prediction or estimate of which reference picture(s) (and reference mode) that may be suitable to use when encoding/decoding the current MB. The prediction is derived through analysis of information related to the encoded/decoded neighboring blocks of the MB, rather than through analysis of the current MB itself. In an encoder, the MB may either be coded or uncoded during this selection of a prediction, since in this example, the prediction is not to be used for the selecting of reference picture(s) (and reference mode) to use when encoding the current MB. In a decoder, the current MB is coded during the prediction.

An exemplifying neighboring block reference indicator analysis and selection of an estimate is illustrated in FIG. 9. In the example illustrated in FIG. 9, four neighboring blocks of a current block are considered. However, the method is applicable also for other sets or subsets of considered neighboring blocks. One example set or neighboring blocks could consist of, e.g., a left block, a top left block and an above block relative to the current block. Another example set could comprise only the left block and above block. In FIG. 9, the neighboring blocks of the current block are associated with the respective reference indicators, or indices, 1, 1, 2 and 0. Thus, the reference indicator "1" has the highest count, i.e. the highest frequency of occurrence, by appearing twice amongst the neighboring blocks. Thus, the reference indicator "1" is selected to represent the prediction or estimate of the reference picture(s) (and mode) used, or to be used, when encoding the current block, or, when the prediction takes place in a decoder, the prediction of the reference picture(s) (and mode) to be used when decoding the current block.

When counting the number of occurrences of a certain reference indicator amongst the neighboring blocks, more than one candidate may have the same highest counting number. This is illustrated in FIG. 10, where the reference indicators "1" and "2" both appear four times. This could be solved, e.g., by selecting the reference indicators in accordance with a predefined ranking scheme. For example, when the reference indicators are represented by the numbers 0-2, as illustrated in FIGS. 9 and 10, the reference indicator represented by the highest, or lowest, number could be selected as prediction.

The difference between a block of predicted pixel values and the original pixel values, i.e. the source before being encoded, is coded by transform coding, e.g. DCT (Discrete Cosine Transform). The output of the transform comprises transform coefficients, which are then quantized. The number of transform coefficients associated with a block reflects how good the match is between the predicted block and the original block, for the given quantization. Relatively few transform coefficients indicate that there is a good match. Consequently, reference indicators associated with blocks having few transform coefficients could be considered more reliable.

Thus, the counting of occurrences could also be weighted according to e.g. the coded transform coefficients associated with the reference blocks. As described above, a reference index associated with a neighboring block with few coded transform coefficients could be considered a more reliable prediction than a reference index associated with a neighboring block with many transform coefficients, and may thus be assigned a larger weight for the reference index prediction. In another example, blocks with coded coefficients may have larger weight than blocks without coded coefficients, i.e. skipped blocks. In another example, a reference index associated with a neighboring block that has a large MV partition, for example a large MB, could be considered more reliable than a neighboring block with a smaller MV partition, and would thus be assigned a larger weight for the reference index prediction. Using weights which are multiples of 2 is beneficial in view of complexity. The weighted counting could also be implemented by use of a lookup table.

Some reference indicators may be more related to each other than others. For example, when using jointly encoded reference information, the reference indicator representing bi-prediction using the reference frames ref0 and ref1 will be more related to the reference indicator representing uni-prediction using one of ref0 and ref1, than for example to a reference indicator representing uni-prediction using reference frame ref2. Thus, when counting a bi-prediction indicator, the corresponding indicators representing uni-prediction using the same reference frames could be updated with some minor count value, i.e. lower than the count value for a "full match". Similarly, reference indicators representing uni-prediction using e.g. ref0 and ref1 are more related to the corresponding reference indicator representing bi-prediction using ref0 and ref1, than to other bi-prediction reference indicators. Thus, when counting a unidirectional reference indicator, the count of reference indicators corresponding to a multi-prediction where the reference frame in question is used can also be updated with some minor value.

FIG. 10 illustrates another exemplifying embodiment of determining the frequency of occurrence of certain reference indicators for a current block, by the counting of reference indicators associated with the neighboring blocks of the current block. Here, the current block is a large MB, and the neighboring blocks are smaller in size than the current block. In some cases it may be of interest to have the same number of neighboring blocks in the context independently of the block size of the blocks in question.

One advantage of introducing reference indicator prediction, or reference index prediction, is to allow more efficient mapping of a VLC table. By considering prediction and the VLC table together, more compression can be obtained. For example, when assuming coding of 3 indices, e.g., (0,1,2), without the use of prediction, a fixed VLC table may be assigned, as the one illustrated in FIG. 11. Assuming that the index symbol "2" occurs most frequently, the table illustrated in FIG. 11 would have a sub-optimal design, since "2" is encoded using a codeword with two bits, i.e. "11", while the less frequent"0" is encoded using one bit, i.e. "0".

When prediction is added, a better VLC table design is enabled. An example of such an improved VLC table design is illustrated in FIG. 12. In such an improved VLC design, the bits spent for encoding a reference indicator or index symbol can be adapted based on the prediction and thus on the context of the current block. In the table illustrated in FIG. 12, the most frequently occurring reference indicator in the context of the current block is encoded using a single bit code word, in this example "0". The code words "10", and "11", comprising two bits, could be defined to identify e.g. the reference indicator having the second highest frequency of occurrence and the reference indicator having the third highest frequency of occurrence, respectively. Both the encoder and decoder of reference indicators should be aware of, and agree on, how to perform the prediction and how to interpret the code words.

The example described above is just a simple example, and it should be noted that the possible design is not limited to this. There are various ways to assign different VLC tables to reference indicators or index symbols, e.g. when more reference indicators or index symbols are involved. An example approach could be to vary the indexing with the probability of occurrence of the indices, such that a frequently occurring reference indicator is assigned a low index number, and vice versa, and that a low index number cost less bits to encode than a high index number. Context-Adaptive Binary Arithmetic Coding (CABAC) can be used to achieve varying bit cost for representing reference indicators or indices according to their probability. Some examples of different contexts are e.g. the reference indicators associated with the neighboring blocks, a counting number of reference indicators, or a weighted counting number of reference indicators, as described above.

In state of the art, e.g. using H.264, the generation of a bi-prediction block using two MVs/reference pictures, blocks or areas, involves averaging over the two reference areas. When an MV points to a sub-pel (sub-pixel) position in a reference area, the sub-pel position pixel values need to be generated first, before averaging. The generation of sub-pel position pixel values is referred to as "spatial filtering", i.e. the generation process involves spatial filtering of the respective reference areas. Thus, the state of the art process for generation of a bi-prediction block using two reference areas involves spatial filtering of the first area; spatial filtering of the second area, and finally averaging over the filtered areas. Spatial filtering is relatively demanding in terms of computational complexity.

It is realized that this computational complexity could be reduced, which will be described below. In order to reduce complexity, a block may first be constructed based on integer motion, e.g. by adding the two reference blocks together (without performing spatial filtering). This adding is an operation which is relatively cheap in terms of computational complexity. Then, the resulting block may be filtered, e.g. interpolated, in order to obtain e.g. half or quarter-pel resolution. The sub-pel adjustment can be performed according to one of the MVs, or based on e.g. separately coded/decoded additional information.

When a block is associated with more than one MV and reference index, which is here referred to as "multi-prediction", the respective unidirectional prediction component of the multi-prediction can be determined. Uni-prediction may be referred to as "single-prediction", as can also e.g. intra prediction. It is realized that partitioning information could be derived based on the absolute difference between these unidirectional predictions. The partitioning information could be derived both in the encoder and the decoder, in order to avoid overhead when conveying fine grained partition information.

In regions where the absolute difference between the uni-directional predictions is relatively large, a single unidirectional prediction or a special bi-prediction could be used. The single unidirectional prediction could be made according to the reference index and MV indicated in the bit stream for one of the uni-prediction component of the bi-prediction (or multi-prediction). In other regions of the block, where the absolute difference between the unidirectional predictions is relatively small, bi-prediction can be used as indicated in the bit stream for the block. The decision of whether to use a single bi-prediction/special bi-prediction for a region, or to use the bi-prediction indicated in the bit-stream, could be based e.g. on a comparison of the absolute difference between the unidirectional predictions associated with the region and a predefined threshold.

Assuming a bi-prediction block associated with 2 MVs and 2 reference areas. Conventionally, at this stage, this block is not further divided, but is encoded as is. However, it is realized that the "implied" information obtained from analyzing the absolute differences or the "difference map", could be used for dividing the block into further partitions, both in the encoder and decoder.

When the absolute difference of 2 reference areas or predictions is calculated, there will be some region(s) in the difference map with higher absolute value(s) and some region(s) with lower absolute value(s). A low value of the absolute difference in a region usually represents that the same object is depicted in this region in both reference areas. If different objects would be depicted in the region in the respective reference areas, the absolute difference would be large. If the same object is depicted in a corresponding region in the respective reference areas, it is suitable and appropriate to average the regions. If the corresponding regions depict different objects, it does not make sense to average them.

For example, a threshold could be defined, where difference values higher than the threshold represent "different objects regions", and difference values lower than the threshold represent "same object regions". The block could be partitioned in accordance with these regions, according to a predefined scheme. As previously stated, the partitioning could be performed based on implicit information, i.e. without explicit signaling describing the partitioning. Another advantage of this is that "non square partitioning" can be supported. For example, when half of a ball is depicted in one block, the partitioning of the block could be made very precise around the ball's border.

The encoder could signal to the decoder if the partitioning approach described above should be used. When signaled that the partitioning approach should be used, the encoder may optionally signal, for regions having a relatively high absolute difference value, which of the unidirectional predictions to use or which special bi-prediction to use. For example, weighted bi-prediction (other than average and possibly with DC offset) could be used. In some cases it may be needed to code/decode some additional information to determine local parameters to be able to produce the special bi-prediction. The obtained partition information can also be used for prediction of partition information and the encoder may code changes compared to the predicted partition to be decoded and used by the decoder. Deriving partition information based on the difference between the reference areas can give a rough indication of how the partitioning should be done. Further refinement by sending refinements of the predicted partition information is also possible.

One example to obtain the partition information is to divide the block into 4 equally sized sub-blocks. The sub-block with largest normalized SAD (Sum of Absolute Differences (divided by the number of pixels on which it was calculated)) is iteratively divided into 4 equally sized regions if the normalized SAD of the sub-block is e.g. equal to or larger than the normalized SAD of the 4 times larger "parent" block. Normalized SAD refers to SAD per pixel or SAD per one specific sub-block size. Instead of SAD, other metrics of pixel differences could alternatively be used. One example is a metric with more weight on strong local image structure, e.g. edges/lines. A remaining sub-block, which is not divided further, is then set to be the partition that should use e.g. some modification of the bi-prediction.

Figure 13:
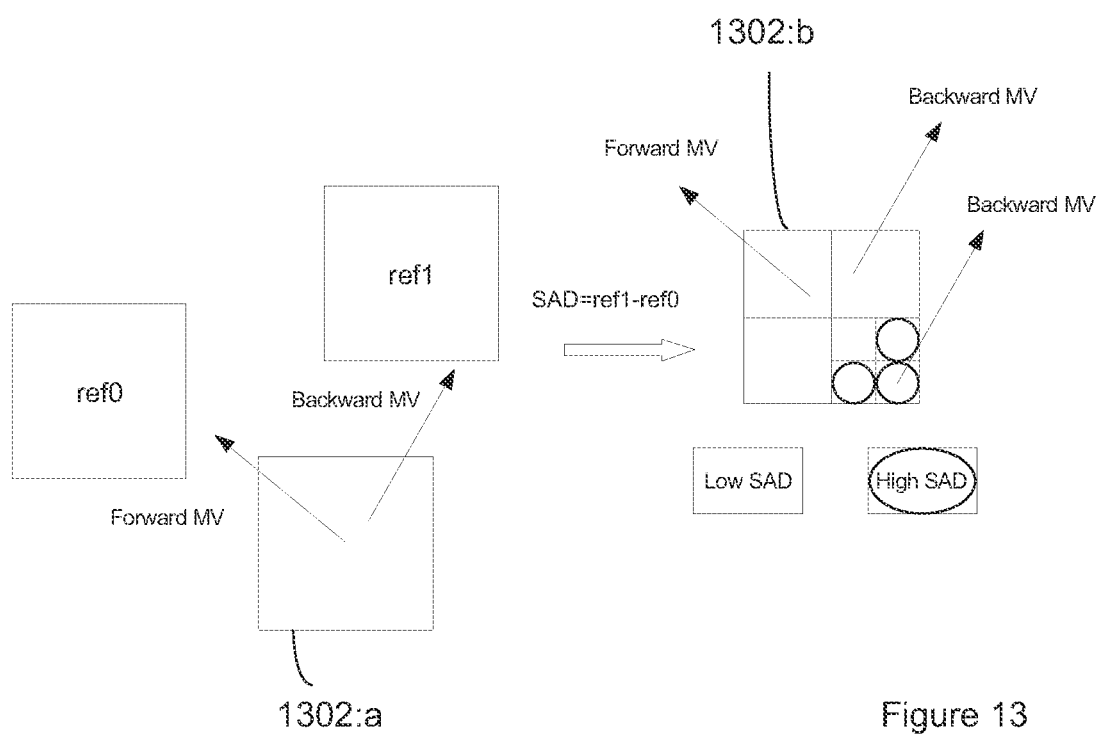
FIG. 13 is a schematic view illustrating partitioning based on implicit information, according to an exemplifying embodiment.

The FIG. 13 shows an exemplifying embodiment of the partitioning method. The block on the left side, 1302:a, is bi-predicted. SAD calculation are performed on the block (now denoted 1302:b), and the high SAD areas are identified and selected out, and are handled accordingly. In this example, the high SAD area is handled by changing to unidirectional prediction with only backward MV. Thus, the original block may be partitioned into two partitions, of which one uses the bi-prediction indicated in the bit stream, and one (illustrated as comprising circles) uses uni-prediction (one of the components of the bi-prediction). Rate Distortion Optimization (RDO) could be used to select the best uni-prediction (component of the bi-prediction).

Another example of how to obtain partitioning information is to divide e.g. a bi-prediction block into a number of e.g. equally sized sub-blocks; determine the maximum SAD of the sub-block size in question, and select the sub-blocks having a SAD "close" to, e.g. within a certain interval from, this maximum value, to be part of a region that is to use some modified version of the bi-prediction, or a uni-directional prediction.

Besides partitioning, this approach can be used e.g. to determine the previously described RIS index or state of the art reference indices, when a bi-prediction mode is used. For example, a smooth difference map for a region may suggest, and be interpreted as, that the region is possibly associated with a "bi-RIS index". The approach could further be used as an alternative prediction or in combination with the previously described Reference Indicator index Prediction. The selection can be made in both the encoder and the decoder based on the SAD between possible candidates of bi-prediction to select the combination with least SAD.

It should be noted that with the above described multi-prediction based partitioning approach, instead of deriving a block-based partitioning, other kinds of partitioning could be derived both at the encoder and the decoder. This includes linear (e.g. horizontal, vertical, or diagonal) or non-linear partitioning of the block into two or more partitions, e.g. according to non-linear image processing methods such as edge detection and/or segmentation. For example, the multi-prediction difference signal can be segmented according to an image-segmentation method such as edge detection or region-growing, and then the block partition is derived based on the segmented difference signal.

The number of sub-partitions could be either derived through image-processing methods such as image segmentation, or could be signaled from the encoder to the decoder. As an alternative to linear or non-linear partitioning, also pixel-based partitioning can be applied. One variant would be to signal from the encoder to the decoder which partitioning method is used, another variant would be that the partitioning method is agreed between encoder and decoder through other signaling means. The advantage with multi-prediction based methods is that the partitioning information can be derived based on information that is already available at the encoder and the decoder, i.e. it does not have to be explicitly signaled, thus reducing the number of bits used for coding.

It should be noted that according to multi-prediction based partitioning, instead of switching from bi-prediction to uni-prediction with unidirectional MVs derived from the MVs used for bi-prediction, it is also possible to signal additional MVs and/or prediction modes (unidirectional inter-picture prediction, bi-directional inter-picture prediction, or intra-picture prediction) for sub-partitions. In other words, the number and shapes of the partitions for a block could either be explicitly signaled and/or be derived from implicit information, based on e.g. a segmentation method. Further, MVs and/or prediction mode may be signaled for some or all of the resulting sub-partitions.

While the procedure as suggested above has been described with reference to specific embodiments provided as examples, the description is generally only intended to illustrate the inventive concept and should not be taken as limiting the scope of the suggested methods and arrangement, which are defined by the appended claims. While described in general terms, the methods and arrangements may be applicable e.g. for different types of communication systems, using commonly available communication technologies, such as e.g. GSM/EDGE, WCDMA or LTE or broadcast technologies over satellite, terrestrial, or cable e.g. DVB-S, DVB-T, or DVB-C, but also for storage/retrieval of video to/from memory.

It is also to be understood that the choice of interacting units or modules, as well as the naming of the units are only for exemplifying purpose, and video handling entities suitable to execute any of the methods described above may be configured in a plurality of alternative ways in order to be able to execute the suggested process actions.

It should also be noted that the units or modules described in this disclosure are to be regarded as logical entities and not with necessity as separate physical entities.

ABBREVIATIONS

AVC Advanced Video Coding
CABAC Context Adapted Binary Arithmetic Coding
GOP Group Of Pictures
MB Macro Block
MV Motion Vector
RIS Reference Index Signaling/Reference information Indicator Signaling
SAD Sum of Absolute Difference
VLC Variable Length Coding

What is claimed is:

1. A method performed by a video decoder, comprising:
decoding an encoded video block, using one or more reference pictures and a reference mode that are jointly indicated by a certain index within a single list of indices;
wherein each index within the single list of indices jointly indicates one of a plurality of reference modes and one or more reference pictures to be used for video decoding, with at least two different indices in the single list respectively indicating different reference modes to be used for decoding;
wherein at least two different indices in the single list of indices respectively indicate a same reference mode but different one or more reference pictures to be used for decoding; and
wherein each of the different reference modes represents either a different one of the one or more reference pictures used for prediction in the decoding or a different combination of multiple ones of the one or more reference pictures used for prediction in the decoding.

2. The method of claim 1, wherein the different reference modes include unidirectional prediction mode representing one reference picture used for prediction in the decoding and bi-directional prediction mode representing two reference pictures used for prediction in the decoding, wherein at least one of said two reference pictures is different from the one reference picture.

3. The method of claim 1, wherein the different reference modes include forward unidirectional prediction or backward unidirectional prediction.

4. The method of claim 1, wherein a first index in the single list jointly indicates a forward unidirectional prediction reference mode and a first reference picture is to be used for video decoding, or a second index in the single list jointly indicates a reverse unidirectional prediction reference mode and a second reference picture is to be used for video decoding, said second reference picture being different from said first reference picture.

5. The method of claim 1, wherein a first index in the single list jointly indicates a forward or backward unidirectional prediction reference mode and a first reference picture is to be used for decoding, and a second index in the single list jointly indicates a bidirectional prediction reference mode and second and third reference pictures are to be used for decoding, said first reference picture being different from at least one of said second and third reference pictures.

6. The method of claim 1, wherein each of the one or more reference pictures is a different reference picture that either precedes or follows a current picture associated with the encoded video block.

7. The method of claim 1 wherein at least one index within the single list of indices jointly indicates one of a plurality of reference modes and two or more reference pictures to be used for video decoding.

8. A video decoder, comprising:
a memory; and
a processor operationally coupled to the memory, wherein the processor and memory are configured to:
   decode an encoded video block, using one or more reference pictures and a reference mode that are jointly indicated by a certain index within a single list of indices;
   wherein each index within the single list of indices jointly indicates one of a plurality of reference modes and one or more reference pictures to be used for video decoding, with at least two different indices in the single list respectively indicating different reference modes to be used for decoding;
   wherein at least two different indices in the single list of indices respectively indicate a same reference mode but different one or more reference pictures to be used for decoding; and
   wherein each of the different reference modes represents either a different one of the one or more reference pictures used for prediction in the decoding, or a different combination of multiple ones of the one or more reference pictures used for prediction in the decoding.

9. The decoder of claim 8, wherein the different reference modes include unidirectional prediction mode representing one reference picture used for prediction in the decoding and bi-directional prediction mode representing two reference pictures used for prediction in the decoding, wherein at least one of said two reference pictures is different from the one reference picture.

10. The decoder of claim 8, wherein the different reference modes include forward unidirectional prediction or backward unidirectional prediction.

11. The decoder of claim 8, wherein a first index in the single list jointly indicates a backward unidirectional prediction reference mode and a first reference picture is to be used for video decoding, or a second index in the single list jointly indicates a forward unidirectional prediction reference mode and a second reference picture is to be used for video decoding, said second reference picture being different from said first reference picture.

12. The decoder of claim 8, wherein a first index in the single list jointly indicates a forward or backward unidirectional prediction reference mode and a first reference picture is to be used for decoding, and a second index in the single list jointly indicates a bidirectional prediction reference mode and second and third reference pictures are to be used for decoding, said first reference picture being different from at least one of said second and third reference pictures.

13. A non-transitory computer-readable medium encoded with a computer program, the computer program comprising computer-executable instructions that when executed by a processor causes the processor to perform operations, wherein the operations are configured to:
   decode an encoded video block, using one or more reference pictures and a reference mode that are jointly indicated by a certain index within a single list of indices;
   wherein each index within the single list of indices jointly indicates one of a plurality of reference modes and one or more reference pictures to be used for video decoding, with at least two different indices in the single list respectively indicating different reference modes to be used for decoding;
   wherein at least two different indices in the single list of indices respectively indicate a same reference mode but different one or more reference pictures to be used for decoding; and
   wherein each of the different reference modes represents either a different one of the one or more reference pictures used for prediction in the decoding, or a different combination of multiple ones of the one or more reference pictures used for prediction in the decoding.

14. The non-transitory computer-readable medium of claim 13, wherein the different reference modes include unidirectional prediction mode representing one reference picture used for prediction in the decoding and bi-directional prediction mode representing two reference pictures used for prediction in the decoding, wherein at least one of said two reference pictures is different from the one reference picture.

15. The non-transitory computer-readable medium of claim 13, wherein the different reference modes include forward unidirectional prediction or backward unidirectional prediction.

16. The non-transitory computer-readable medium of claim 13, wherein a first index in the single list jointly indicates a backward unidirectional prediction reference mode and a first reference picture is to be used for video decoding, or a second index in the single list jointly indicates a forward unidirectional prediction reference mode and a second reference picture is to be used for video decoding, said second reference picture being different from said first reference picture.

17. The non-transitory computer-readable medium of claim 13, wherein a first index in the single list jointly indicates a forward or backward unidirectional prediction reference mode and a first reference picture is to be used for decoding, and a second index in the single list jointly indicates a bidirectional prediction reference mode and second and third reference pictures are to be used for decoding, said first reference picture being different from at least one of said second and third reference pictures.

* * * * *

UNITED STATES PATENT AND TRADEMARK OFFICE
CERTIFICATE OF CORRECTION

PATENT NO. : 10,542,284 B2
APPLICATION NO. : 14/718150
DATED : January 21, 2020
INVENTOR(S) : Wu et al.

Page 1 of 1

It is certified that error appears in the above-identified patent and that said Letters Patent is hereby corrected as shown below:

In the Specification

In Column 1, Line 8, delete "2012," and insert -- 2012, now Pat. No. 9,071,845, --, therefor.

In Column 1, Line 53, delete "N=14)." and insert -- N=14. --, therefor.

In Column 8, Line 32, delete "L1 and L1" and insert -- L0 and L1 --, therefor.

Signed and Sealed this
Twenty-sixth Day of May, 2020

Andrei Iancu
*Director of the United States Patent and Trademark Office*